United States Patent
Large

(10) Patent No.: US 10,082,669 B2
(45) Date of Patent: Sep. 25, 2018

(54) VARIABLE-DEPTH STEREOSCOPIC DISPLAY

(71) Applicant: Microsoft Technology Licensing, LLC, Redmond, WA (US)

(72) Inventor: Timothy Andrew Large, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/047,859

(22) Filed: Feb. 19, 2016

(65) Prior Publication Data

US 2016/0161739 A1    Jun. 9, 2016

Related U.S. Application Data

(63) Continuation of application No. 13/192,321, filed on Jul. 27, 2011, now abandoned.

(51) Int. Cl.
| | | |
|---|---|---|
| *G09G 3/36* | (2006.01) | |
| *G02B 27/00* | (2006.01) | |
| *G09G 3/34* | (2006.01) | |
| *G02B 27/22* | (2018.01) | |
| *G02F 1/1335* | (2006.01) | |

(52) U.S. Cl.
CPC ......... *G02B 27/0075* (2013.01); *G02B 27/22* (2013.01); *G02B 27/2214* (2013.01); *G02F 1/133615* (2013.01); *G09G 3/3406* (2013.01)

(58) Field of Classification Search
CPC .. G02B 6/0028; G02B 6/0018; G02B 6/0061; G02B 6/0058; G02B 6/0076; G02B 27/225; G02B 27/2214; G09G 3/3406; G02F 1/133615

USPC ................ 359/462, 464; 345/102; 363/278; 349/65

See application file for complete search history.

(56) References Cited

U.S. PATENT DOCUMENTS

| | | |
|---|---|---|
| 4,735,495 A | 4/1988 | Henkes |
| 5,319,455 A | 6/1994 | Hoarty et al. |
| 5,806,955 A | 9/1998 | Parkyn, Jr. et al. |
| 5,808,713 A | 9/1998 | Broer et al. |

(Continued)

FOREIGN PATENT DOCUMENTS

| | | |
|---|---|---|
| JP | 2000106021 | 4/2000 |
| JP | 2002162912 | 6/2002 |

(Continued)

OTHER PUBLICATIONS

"Final Office Action", U.S. Appl. No. 13/192,321, dated Feb. 5, 2015, 20 pages.

(Continued)

*Primary Examiner* — Audrey Y Chang

(57) ABSTRACT

This document describes various techniques for implementing a variable-depth stereoscopic display. A first distance at which a viewer is disposed relative to a stereoscopic display is received. Once received, a second distance by which to change a front focal distance of a lens structure of the stereoscopic display is determined based on the first distance. The front focal distance of the lens structure is then caused to change by the second distance effective to display a stereoscopic image at the first distance.

20 Claims, 14 Drawing Sheets

(56) References Cited

U.S. PATENT DOCUMENTS

| | | | |
|---|---|---|---|
| 5,838,403 | A | 11/1998 | Jannson et al. |
| 6,072,551 | A | 6/2000 | Jannson et al. |
| 6,124,906 | A | 9/2000 | Kawada et al. |
| 6,129,444 | A | 10/2000 | Tognoni |
| 6,256,447 | B1 | 7/2001 | Laine |
| 6,529,179 | B1 | 3/2003 | Hashimoto et al. |
| 6,648,485 | B1 | 11/2003 | Colgan et al. |
| 6,710,920 | B1 | 3/2004 | Mashitani et al. |
| 6,752,498 | B2 | 6/2004 | Covannon et al. |
| 6,834,961 | B1 | 12/2004 | Cobb et al. |
| 6,870,671 | B2 | 3/2005 | Travis |
| 6,895,164 | B2 | 5/2005 | Saccomanno |
| 7,104,679 | B2 | 9/2006 | Shin et al. |
| 7,153,017 | B2 | 12/2006 | Yamashita et al. |
| 7,260,823 | B2 | 8/2007 | Schlack et al. |
| 7,369,192 | B2 | 5/2008 | Ambrose et al. |
| 7,370,342 | B2 | 5/2008 | Ismail et al. |
| 7,375,885 | B2 | 5/2008 | Ijzerman et al. |
| 7,431,489 | B2 | 10/2008 | Yeo et al. |
| 7,450,188 | B2 * | 11/2008 | Schwerdtner ......... G02B 27/225 348/E13.029 |
| 7,503,684 | B2 | 3/2009 | Ueno et al. |
| 7,518,593 | B2 * | 4/2009 | Daiku ................... G02B 6/0058 345/102 |
| 7,528,374 | B2 | 5/2009 | Smitt et al. |
| 7,572,045 | B2 | 8/2009 | Hoelen et al. |
| 7,631,327 | B2 | 12/2009 | Dempski et al. |
| 7,660,047 | B1 * | 2/2010 | Travis ..................... G06F 3/042 359/726 |
| 7,773,849 | B2 * | 8/2010 | Shani .................... G02B 6/0028 349/144 |
| 7,844,985 | B2 | 11/2010 | Hendricks et al. |
| 7,957,082 | B2 | 6/2011 | Mi et al. |
| 7,970,246 | B2 | 6/2011 | Travis et al. |
| 8,035,771 | B2 * | 10/2011 | Brott ..................... G02B 6/0061 345/102 |
| 8,059,217 | B2 | 11/2011 | Brott et al. |
| 8,189,973 | B2 | 5/2012 | Travis et al. |
| 8,354,806 | B2 | 1/2013 | Travis et al. |
| 2006/0083004 | A1 | 4/2006 | Cok |
| 2006/0146573 | A1 | 7/2006 | Iwauchi et al. |
| 2006/0215244 | A1 | 9/2006 | Yosha et al. |
| 2007/0201246 | A1 | 8/2007 | Yeo et al. |
| 2007/0274099 | A1 | 11/2007 | Tai et al. |
| 2008/0018732 | A1 | 1/2008 | Moller |
| 2008/0266863 | A1 * | 10/2008 | Rinko ................... G02B 6/0018 362/278 |
| 2008/0284801 | A1 | 11/2008 | Brigham et al. |
| 2008/0316768 | A1 | 12/2008 | Travis |
| 2010/0289870 | A1 | 11/2010 | Leister |
| 2011/0043142 | A1 | 2/2011 | Travis |
| 2011/0075257 | A1 * | 3/2011 | Hua ..................... G02B 27/017 359/464 |
| 2011/0242298 | A1 | 10/2011 | Bathiche et al. |
| 2011/0273906 | A1 * | 11/2011 | Nichol ................. G02B 6/0076 362/607 |
| 2013/0027772 | A1 | 1/2013 | Large |

FOREIGN PATENT DOCUMENTS

| | | |
|---|---|---|
| JP | 2005331565 | 12/2005 |
| JP | 2006294361 A | 10/2006 |
| KR | 20010039013 | 5/2001 |
| KR | 20080009490 | 1/2008 |
| KR | 20080055051 | 6/2008 |
| WO | WO-2005059874 | 6/2005 |
| WO | WO-2006044818 | 4/2006 |
| WO | WO-2011022342 | 2/2011 |

OTHER PUBLICATIONS

"Final Office Action", U.S. Appl. No. 13/192,321, dated Oct. 21, 2013, 15 pages.

"International Search Report", Application No. PCT/US2010/045676, dated Apr. 28, 2011, 2 pages.

"International Search Report", Application No. PCT/US2010/046129, dated Mar. 2, 2011, 9 pages.

"Non-Final Office Action", U.S. Appl. No. 12/621,275, dated Jul. 27, 2012, 5 pages.

"Non-Final Office Action", U.S. Appl. No. 13/192,321, dated Jun. 27, 2013, 13 pages.

"Non-Final Office Action", U.S. Appl. No. 13/192,321, dated Jul. 10, 2014, 18 pages.

"Non-Final Office Action", U.S. Appl. No. 13/192,321, dated Aug. 21, 2015, 19 pages.

"Notice of Allowance", U.S. Appl. No. 12/621,275, dated Nov. 14, 2012, 7 Pages.

"Real-Time Television Content Platform", retrieved from <http://www.accenture.com/us-en/pages/insight-real-time-television-platform.aspx> on Mar. 10, 2011, May 28, 2002, 3 pages.

"Restriction Requirement", U.S. Appl. No. 13/192,321, dated May 13, 2013, 5 pages.

"What is the PD-Net Project About?", retrieved from <http://pd-net.org/about/> on Mar. 10, 2011, Mar. 10, 2011, 3 pages.

Dodgson,"A Time Sequential Multi-Projector Autostereoscopic Display", Journal of the Society for Information Display 8(2), Available at <http://citeseerx.ist.psu.edu/viewdoc/download?doi=10.1.1.13.9821&rep=rep1&type=pdf>, 2000, pp. 1-12.

Iizuka,"Using Cellophane to Convert a Liquid Crystal Display Screen into a Three Dimensional Display (3D Laptop Computer and 3D Camera Phone)", Retrieved from: <http://individual.utoronto.ca/iizuka/research/cellophane.htm> on Apr. 5, 2011, 2003, 24 pages.

Lee,"Flat-Panel Autostereoscopic View-Sequential 3D Display Backlight", retrieved at <http://www2.eng.cam.ac.uk/~arlt1/04%20Flat-panel%20autostereoscopic%203D%20display%20backlight.pdf> on Aug. 24, 2009, 4 pages.

Nagi,"The Concept of "AdapTV"", Broadcast Technology, No. 28, Autumn 2006, retrieved from <http://www.nhk.or.jp/strl/publica/bt/en/ch0028.pdf>, Oct. 2006, pp. 16-17.

Quante,"Evaluation of a Single User Autostereoscopic Display System for 3D-TV and PC Oriented Applications—An Example of a User Centered Design Cycle", 19th International.

Symposium on Human Factors in Telecommunication, Available at <http://www.hft.org/HFT03/paper03/37_Qua.pdf>, Dec. 2003, 8 pages.

Surman,"Head Tracked Single and Multi-User Autostereoscopic Displays", In Proceedings of CVMP 2006, Available at <http://www.ijsselsteijn.nl/papers/IET2006.pdf>, Nov. 2006, 9 pages.

Travis,"Flat Projection for 3-D", In Proceedings of the IEEE, vol. 94 Issue: 3, Available at <http://ieeexplore.ieee.org/stamp/stamp.jsp?tp=&arnumber=1605201>, Mar. 13, 2006, pp. 539-549.

Travis,"P-127: Linearity in Flat Panel Wedge Projection", SID 03 Digest, retrieved from <http://www2.eng.cam.ac.uk/~arlt1/Linearity%20in%20flat%20panel%20wedge%20projection.pdf>, May 12, 2005, pp. 716-719.

Travis,"Scanning Collimation of Light Via Flat Panel Lamp", U.S. Appl. No. 61/235,928, Aug. 21, 2009, pp. 1-15.

Urey,"State of the Art in Stereoscopic and Autostereoscopic Displays", Proceedings of the IEEE, vol. 99, No. 4, Available at <http://ieeexplore.ieee.org/stamp/stamp.jsp?arnumber=05701756>, Apr. 2011, pp. 540-555.

* cited by examiner

VARIABLE-DEPTH STEREOSCOPIC DISPLAY

RELATED APPLICATIONS

This application is a continuation of and claims priority to U.S. application Ser. No. 13/192,321 entitled "Variable-Depth Stereoscopic Display" filed Jul. 27, 2011, the disclosure of which is incorporated in its entirety.

BACKGROUND

Content providers are increasingly offering content in three-dimensional (3D) format to enhance a viewing experience. This 3D content is often shown on specialized 3D displays that split the 3D content into different images targeted to each eye of a viewer. Different imagery can be displayed to each eye of a viewer in a variety of ways including the use of passive eyewear, active eyewear, dual head-mounted displays, or dividing the image directionally without the use of eyewear (auto-stereoscopy). Although auto-stereoscopy does not require the use of specialized glasses or multiple displays, a distance at which the divided images are effective to produce 3D imagery is generally limited. As such, stereoscopic displays are unable to display 3D imagery to a viewer that moves out of a focal plane of the display or to multiple viewers at varying distances from the display.

SUMMARY

This document describes various apparatuses and techniques for implementing a variable-depth stereoscopic display. These apparatuses and techniques may enable a stereoscopic display to provide three-dimensional (3D) content to a viewer over different distances from the stereoscopic display or to multiple viewers at varying distances from the stereoscopic display. A first distance at which a viewer is disposed relative to a stereoscopic display can be received. Once received, a second distance by which to change a front focal distance of a lens structure of the stereoscopic display is determined based on the first distance. The front focal distance of the lens structure is then caused to change by the second distance effective to display a stereoscopic image at the first distance. By so doing, a front focal distance of the stereoscopic display can be varied to provide 3D content to a viewer at different distances from the stereoscopic display.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference number in different instances in the description and the figures may indicate similar or identical items.

DETAILED DESCRIPTION

Overview

This document describes various apparatuses and techniques for implementing a variable-depth stereoscopic display. Various embodiments of these techniques change a front focal distance of a stereoscopic display, which allows the stereoscopic display to provide 3D content to a viewer over different distances from the stereoscopic display or to multiple viewers at varying distances from the stereoscopic display.

Consider a case where two viewers are watching 3D content (e.g., a movie or video-game) on a stereoscopic television device. Assume that both viewers are positioned at approximately the same distance from the television device, such as sitting at a couch roughly parallel with the television device, and are able to view the 3D content. Assume now, that one of the viewers would like to move to a position closer to or farther from to the television device (e.g., a chair located closer to the television device). The described apparatuses and techniques enable the 3D content to be provided to both viewers at different distances from the television device or to a viewer that moves closer to or farther from the television device.

Example Environment

Figure 1:
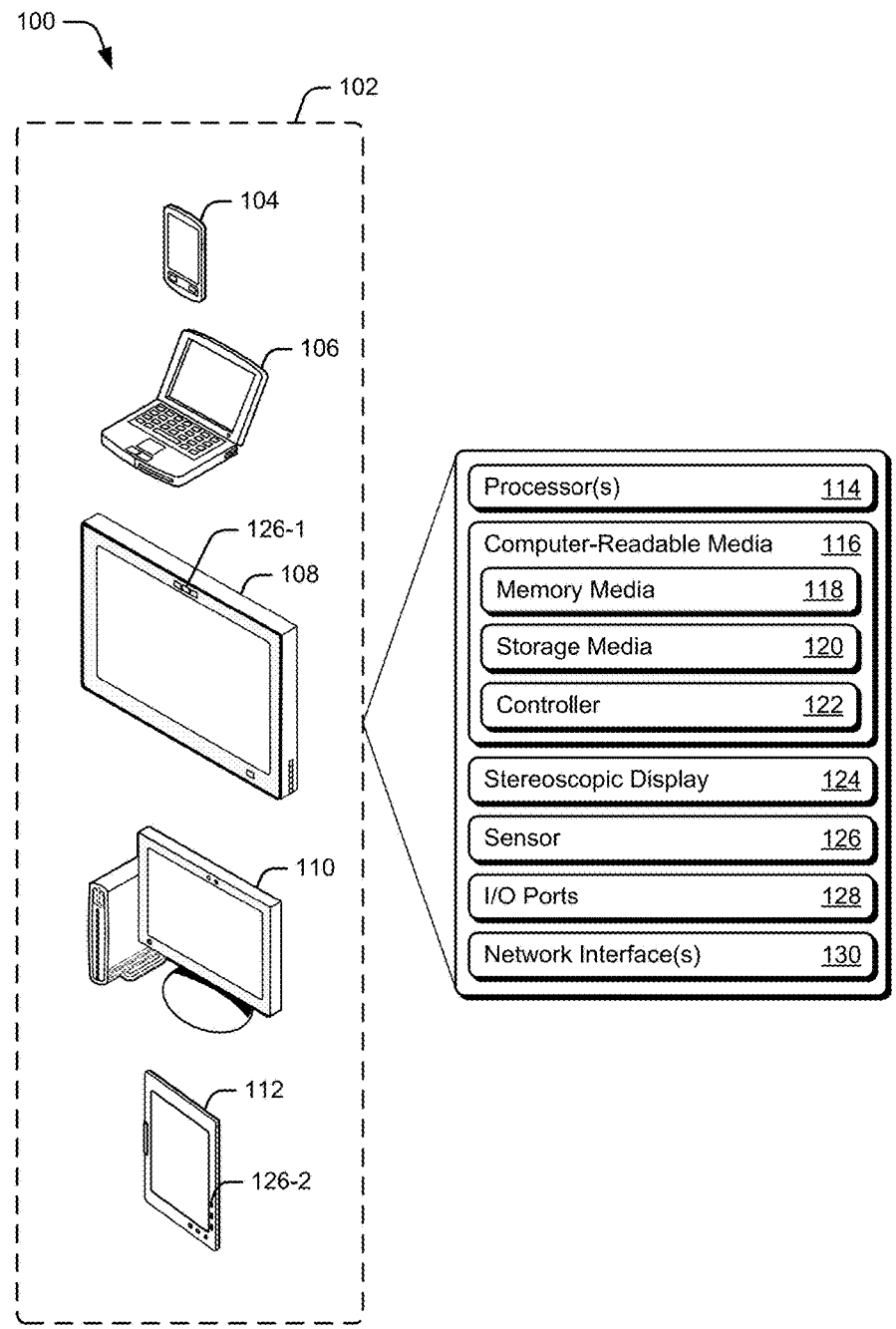
FIG. 1 illustrates an example environment in which these techniques may be implemented.

FIG. 1 is an illustration of an example environment 100 in which a variable-depth stereoscopic display can be implemented. Environment 100 includes display device 102 which is illustrated, by way of example and not limitation, as one of a smart phone 104, laptop computer 106, television device 108, desktop computer 110, or tablet computer 112. Generally, display device 102 can provide three-dimensional (3D) content to viewers without the use of special 3D eyewear. 3D content may comprise images (e.g., stereoscopic imagery) and/or video effective to cause a viewer to be able to perceive depth within the content when displayed. In some embodiments, the 3D content is manipulable by a viewer or user, such as when displayed in connection with an application or user interface of a display device capable of accepting user input (e.g., a touch-screen enabled smart phone 104 or television device 108 operably associated with gaming controllers or optical-spatial sensors).

Display device 102 includes processor(s) 114 and computer-readable media 116, which includes memory media 118 and storage media 120. Applications and/or an operating system (not shown) embodied as computer-readable instructions on computer-readable memory 116 can be executed by processor(s) 114 to provide some or all of the functionalities described herein. Computer-readable media also includes stereoscopic-depth controller (controller) 122. How controller 122 is implemented and used varies, and is described as part of the methods discussed below.

Display device 102 also includes stereoscopic display 124, sensor 126, input/output (I/O) ports 128, and network interface(s) 130. Stereoscopic display 124 is capable of generating stereoscopic 3D content that can be viewed without the use of special eyewear. Stereoscopic display 124 may be separate or integral with display device 102; integral examples include smart phone 104, laptop 106, and tablet 112; separate examples include television device 108 and, in some instances, desktop computer 110 (e.g., when embodied as a separate tower and monitor (shown)).

Sensor 126 collects viewer positional data useful to determine a position of a viewer relative stereoscopic display 124. The viewer positional data can be useful determine a distance of a viewer from stereoscopic display 124 (relative Z position), a distance of a viewer from a horizontal axis of stereoscopic display 124 (relative Y position), or a distance of a viewer from a vertical axis of stereoscopic display 124 (relative x position). In at least some embodiments, an approximate position of a viewer's eyes can be determined with the viewer positional data provided by sensor 126. Sensor 126 may be separate or integral with display device 102; integral examples include sensor 126-1 of television device 108 and sensor 126-2 of tablet computer 112; separate examples include stand-alone sensors, such as sensors operably coupled with display device 102, a set-top box, or a gaming device.

Sensor 126 can collect viewer position data by way of various sensing technologies, either working alone or in conjunction with one another. Sensing technologies may include, by way of example and not limitation, optical, radio-frequency, acoustic (active or passive), micro-electromechanical systems (MEMS), ultrasonic, infrared, pressure sensitive, and the like. In some embodiments, sensor 126 may receive additional data or work in conjunction with a remote control device or gaming controller associated with one or more viewers to generate the viewer positional data.

I/O ports 128 of display device 102 enable interaction with other devices, media, or users. I/O ports 128 can include a variety of ports, such as by way of example and not limitation, high-definition multimedia (HDMI), digital video interface (DVI), display port, fiber-optic or light-based, audio ports (e.g., analog, optical, or digital), USB ports, serial advanced technology attachment (SATA) ports, peripheral component interconnect (PCI) express based ports or card slots, serial ports, parallel ports, or other legacy ports. In at least some instances, 3D content is received by display device 102 via one or more I/O ports 128 from another device or source (e.g., a set-top box or content receiving device).

Display device 102 may also include network interface(s) 130 for communicating data over wired, wireless, or optical networks. Data communicated over such networks may include 3D content that can be displayed or interacted with via stereoscopic display 124. By way of example and not limitation, network interface 130 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like.

Figure 2:
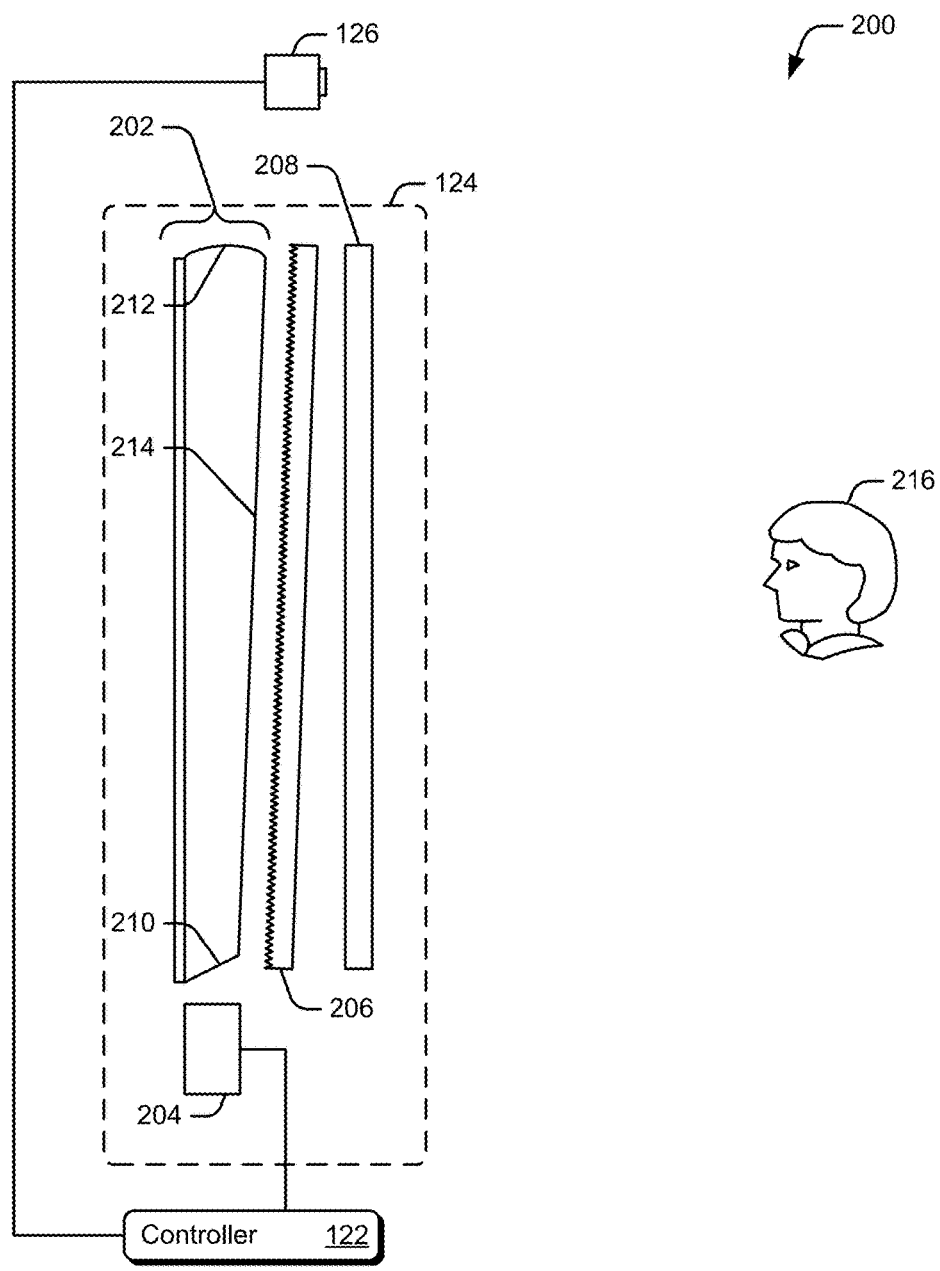
FIG. 2 illustrates an example display of the display device of FIG. 1 in more detail.

FIG. 2 illustrates a detailed example of stereoscopic display 124 of FIG. 1. Stereoscopic display 124 includes lens structure 202, light injection system 204, light re-director 206, and spatial light modulator 208. Stereoscopic display 124 may be configured as a non-projection based flat panel display having a depth or thickness similar to that of a liquid crystal display (LCD) panel and the like. Lens structure 202 emits light from a surface when light is received from light injection system 204. The light emitted from lens structure may be collimated light. In some case, lens structure 202 is an optical wedge having a thin end 210 to receive light, a thick end 212 effective to reflect the light (e.g., via an end reflector or reflective cladding), and a viewing surface 214 at which the light is emitted as collimated light.

In some implementations, an optical wedge may comprise an optical lens or light guide that permits light input at an edge of the optical wedge (e.g., thin end 210) to fan out within the optical wedge via total internal reflection before reaching the critical angle for internal reflection and exiting via another surface of the optical wedge (e.g., viewing surface 214). The light may exit the optical wedge at a glancing angle relative to viewing surface 214.

The light emitted by lens structure 202 can be scanned by varying light generated by light injection system 204 or an injection location thereof. Generally, scanning the light enables the display of 3D content that is viewable without the use of special eyewear. The scanned light enables display of different stereoscopic imagery to each eye of a respective viewer.

Light injection system 204 may include any suitable type or number of light sources, such as by way of example and not limitation, cold-cathode fluorescent lamps (CCFL), light emitting diodes (LEDs), light engines, lasers (chemical or solid-state), and the like. How the light of light injection source 204 is generated and controlled varies, and is described in conjunction with subsequent figures and methods.

In some cases, stereoscopic display 124 includes light re-director 206 located adjacent to viewing surface 214 to diffuse collimated light emitted by lens structure 202. This collimated light may exit lens structure 202 at a glancing angle with respect to viewing surface 214. Here, light re-director 206 can re-direct the emitted light of lens structure 202 towards viewer 216 and may provide a diffusing function in one dimension. Light re-director 206 can be configured as any suitable structure, such as a film of prisms or a light-guide panel having a prismatic textured surface. By varying angles of prisms or prismatic features over a surface of light re-director 206, light re-director 206 can be configured to have optical power capable of focusing the collimated light emitted from viewing surface 214 of lens structure 202 towards the eyes of viewer 216.

Spatial light modulator 208 modulates the light with visual information to form imagery displayed by the light converging on the eyes of viewer 216. In some cases, the visual information is parallax information directed to different eyes of viewer 216 in order to provide the 3D content. For instance, spatial light modulator 208 can modulate light directed towards a viewer's left eye with a frame of stereoscopic imagery, and then modulate light directed to a viewer's right eye with another frame of stereoscopic imagery. Thus, by synchronizing scanning and modulation of light (collimated or otherwise), 3D content can be provided to a viewer. Spatial light modulator 208 can be any suitable structure such as a liquid crystal display (LCD) cell composed of an array of pixels or sub-pixels capable of light modulation and/or manipulation.

In this particular example, controller 122 is operably coupled to light injection system 204 and sensor 126. In some cases, controller 122 is operably coupled with spatial light modulator 208 or a modulation-controller associated therewith. Controller 122 receives viewer position information, such as a distance to a viewer, collected by sensor 126 and, as described in the following sections and associated methods, can control light injection source 204 effective to display 3D imagery via stereoscopic display 124 over various distances.

Figure 3:
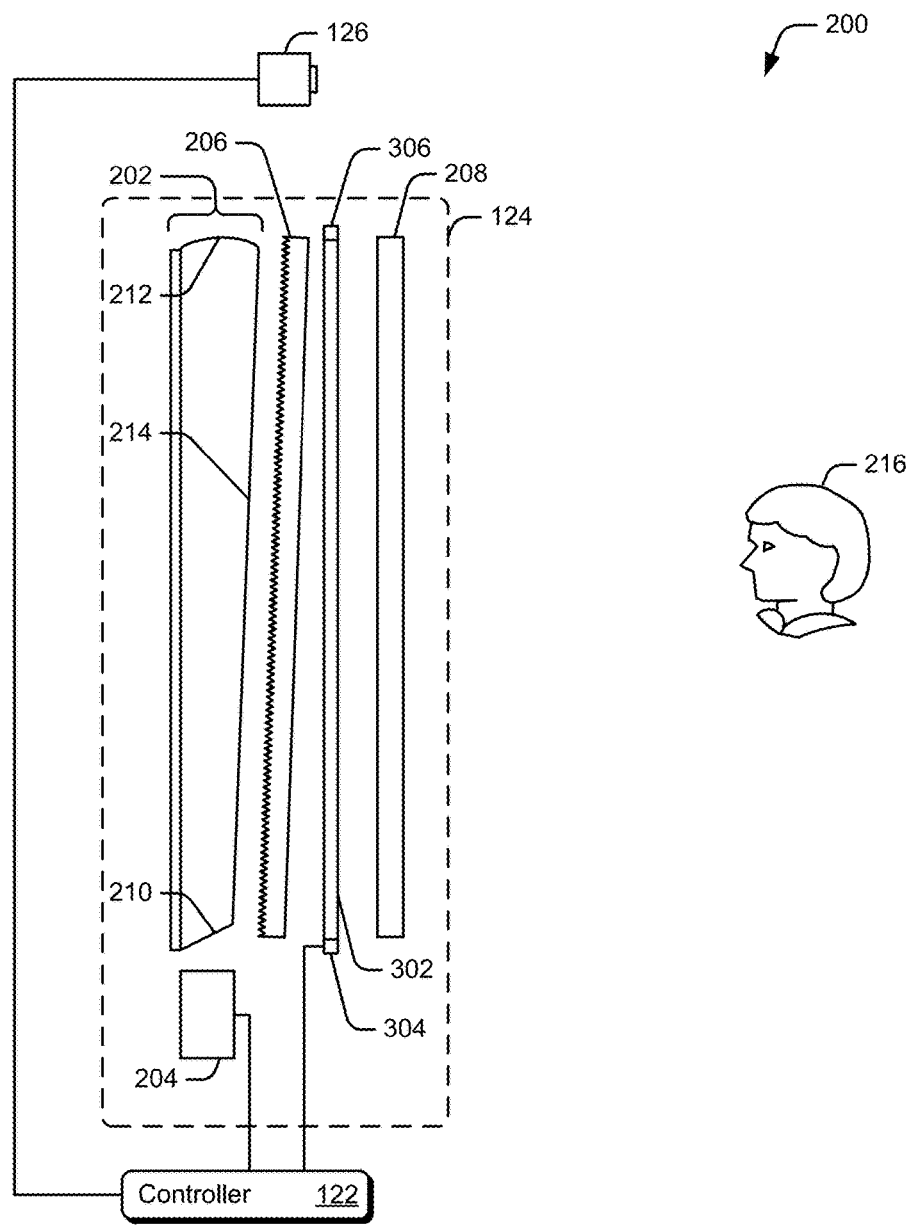
FIG. 3 illustrates another example display of the display device of FIG. 1 in more detail.

FIG. 3 illustrates another detailed example of stereoscopic display 124 of FIG. 1. Stereoscopic display 124 includes lens structure 202, light injection system 204, liquid crystal lens (LQ lens) 302, and spatial light modulator 208. Lens structure 202 emits light (collimated or otherwise) from a surface when light is received from light injection system 204. In some cases, lens structure 202 is an optical wedge having a thin end 210 to receive light, a thick end 212 effective to reflect the light, and a viewing surface 214 at which the light is emitted as collimated light. Display 124 can be configured as a non-projection based flat panel display having a depth or thickness similar to that of a liquid crystal display (LCD) panel and the like.

The light emitted by lens structure 202 can be scanned by varying light generated by light injection system 204 or an injection location thereof. Generally, scanning the light enables the display of 3D content that is viewable without the use of special eyewear. The scanned light enables display of different stereoscopic imagery to each eye of a respective viewer.

Light injection system 204 may include any suitable type or number of light sources, such as by way of example and not limitation, cold-cathode fluorescent lamps (CCFL), light emitting diodes (LEDs), light engines, lasers (chemical or solid-state), and the like. How the light of light injection source 204 is generated and controlled varies, and is described in conjunction with subsequent figures and methods.

Stereoscopic display 124 may also include light re-director 206 located adjacent to viewing surface 214 to diffuse collimated light emitted by lens structure 202. This collimated light may exit lens structure 202 at a glancing angle with respect to viewing surface 214. Here, light re-director 206 can re-direct the emitted light of lens structure 202 towards viewer 216 and may provide a diffusing function in one dimension. Light re-director 206 can be configured as any suitable structure, such as a film of prisms or a light-guide panel having a prismatic textured surface. By varying angles of prisms or prismatic features over a surface of light re-director 206, light re-director 206 can be configured to have optical power capable of focusing the collimated light emitted from viewing surface 214 of lens structure 202 towards the eyes of viewer 216.

In this particular example, stereoscopic display 124 includes LQ lens 302 located adjacent to light re-director 206 capable of varying a depth at which stereoscopic imagery is provided. As light re-directed by light re-director 206 passes through LQ lens 302, a focal depth (or focal length) of lens structure 202 can be varied by focusing or re-focusing LQ lens 302. Affecting or manipulating liquid crystal molecules of LQ lens 302 may focus or re-focus light emitted by lens structure 202. LQ lens 302 may comprise two transparent substrates, such as glass or other transparent material, between which these liquid crystal molecules are disposed. LQ lens 302 also includes electrodes 304 and 306 for applying excitation voltage to LQ lens 302. In some cases, these electrodes may be composed of a transparent material such as indium tin oxide (ITO) so as not to compromise clarity or transparency of LQ lens 302. Although illustrated as having two electrodes 304 and 306, LQ lens 302 may include any suitable number of electrodes proximate the perimeter of the lens to apply excitation voltage between any two peripheral points of LQ lens 302. Alternately or additionally, one or both of the transparent substrates can be coated, either in part or entirely, with transparent conductive coating, such as ITO and the like.

Applying excitation voltage to LQ lens 302 can re-align the liquid crystal molecules effective to re-focus LQ lens 302 at various distances. Although not shown, other layers or substrates located proximate the liquid crystal molecules of LQ lens 302 may affect a uniformity of a distortion or alignment of the liquid crystal molecules when under the influence of an electrical excitation field. In some cases, affect enables LQ lens 302 to focus light emitted from lens structure 202 at various distances. As is described in conjunction with subsequent figures and methods, varying a focal distance of lens structure 202 enables implementation of a variable depth stereoscopic display. LQ lens 302 may be used in place of (e.g., instead of light guides) or in conjunction with any other elements described herein in order to implement a stereoscopic display.

Spatial light modulator 208 modulates the light exiting LQ lens 302 with visual information to form imagery displayed by the light converging on the eyes of viewer 216. In some cases, the visual information is parallax information directed to different eyes of viewer 216 in order to provide the 3D content. For instance, spatial light modulator 208 can modulate light directed towards a viewer's left eye with a frame of stereoscopic imagery, and then modulate light directed to a viewer's right eye with another frame of stereoscopic imagery. Thus, by synchronizing scanning and modulation of light (collimated or otherwise), 3D content can be provided to a viewer. Spatial light modulator 208 can be any suitable structure such as a liquid crystal display (LCD) cell composed of an array of pixels or sub-pixels capable of light modulation and/or manipulation.

In this particular example, controller 122 is operably coupled to light injection system 204, LQ lens 302, and sensor 126. Controller 122 receives viewer position information, such as a distance to a viewer, collected by sensor 126 and, as described in the following sections and associated methods, can control light injection source 204 or LQ lens 302 effective to display 3D imagery via stereoscopic display 124 over various distances.

Figure 4:
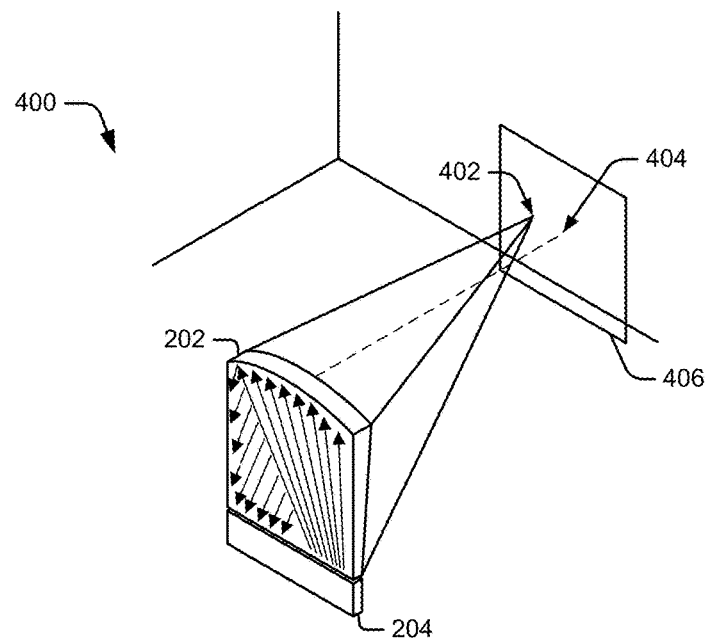
FIG. 4 illustrates an example of scanning light with components of the display of FIG. 2.
Figure 5:
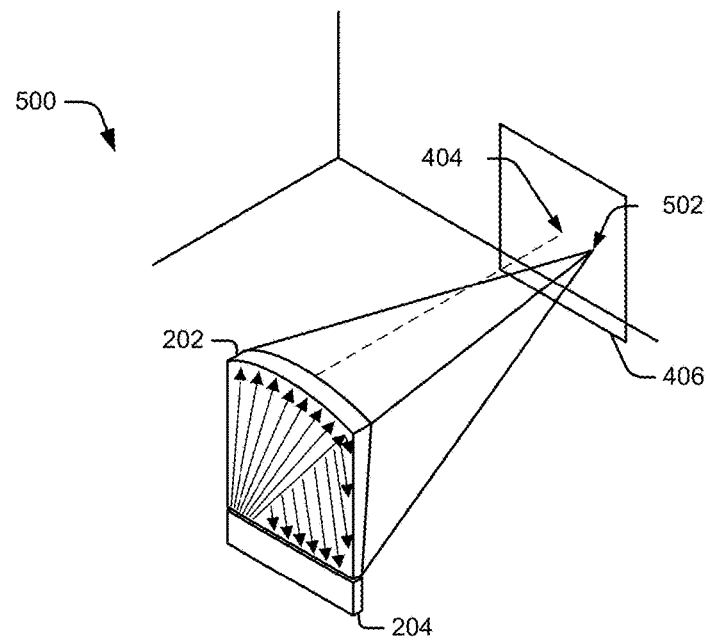
FIG. 5 illustrates another example of scanning light with components of the display of FIG. 2.

FIGS. 4 and 5 illustrate an example of scanning light by varying a location at which light is injected into lens structure 202 at 400 and 500 respectively. Generally, scanning light is performed by directing the light horizontally across a viewing plane or area as shown in FIGS. 4 and 5. 3D imagery can be displayed to a viewer with scanned light that directs different images to each of the viewer's eyes. For example, 3D video content split into imagery intended for a viewer's right eye and a viewer's left eye, when interleaved and displayed at sufficient frequency, enables the viewer to experience the 3D video without special eyewear.

Specifically, the light can be directed to the left (300) by shifting a location of light injection to the right, and vice versa (400) as illustrated by ray traces within lens structure 202 in each respective figure. Additionally, in each figure, a visible portion of a single pixel of light, shown respectively at 402 and 502, is illustrated for clarity. Illustrating perspective, lines tracing a path of the light from the corners of lens structure 202 to the points of light 402 and 502 are shown respectively with respect to center line 404 and focal plane 406.

A location at which light is injected can be varied in any suitable way. For example, a light injection system 204 may comprise LEDs that are individually selectable to provide light at different locations along the lens structure effective to scan light emitted by the lens structure. In this particular example, selecting one or more LEDs proximate one end of the lens structure (right-hand side) directs light in an opposite direction (left-hand side), as illustrated by 400. In other cases, light injection system 204 may include a laser and an acousto-optic modulator or liquid crystal hologram for controlling directionality of a beam produced by the laser.

Figure 6:
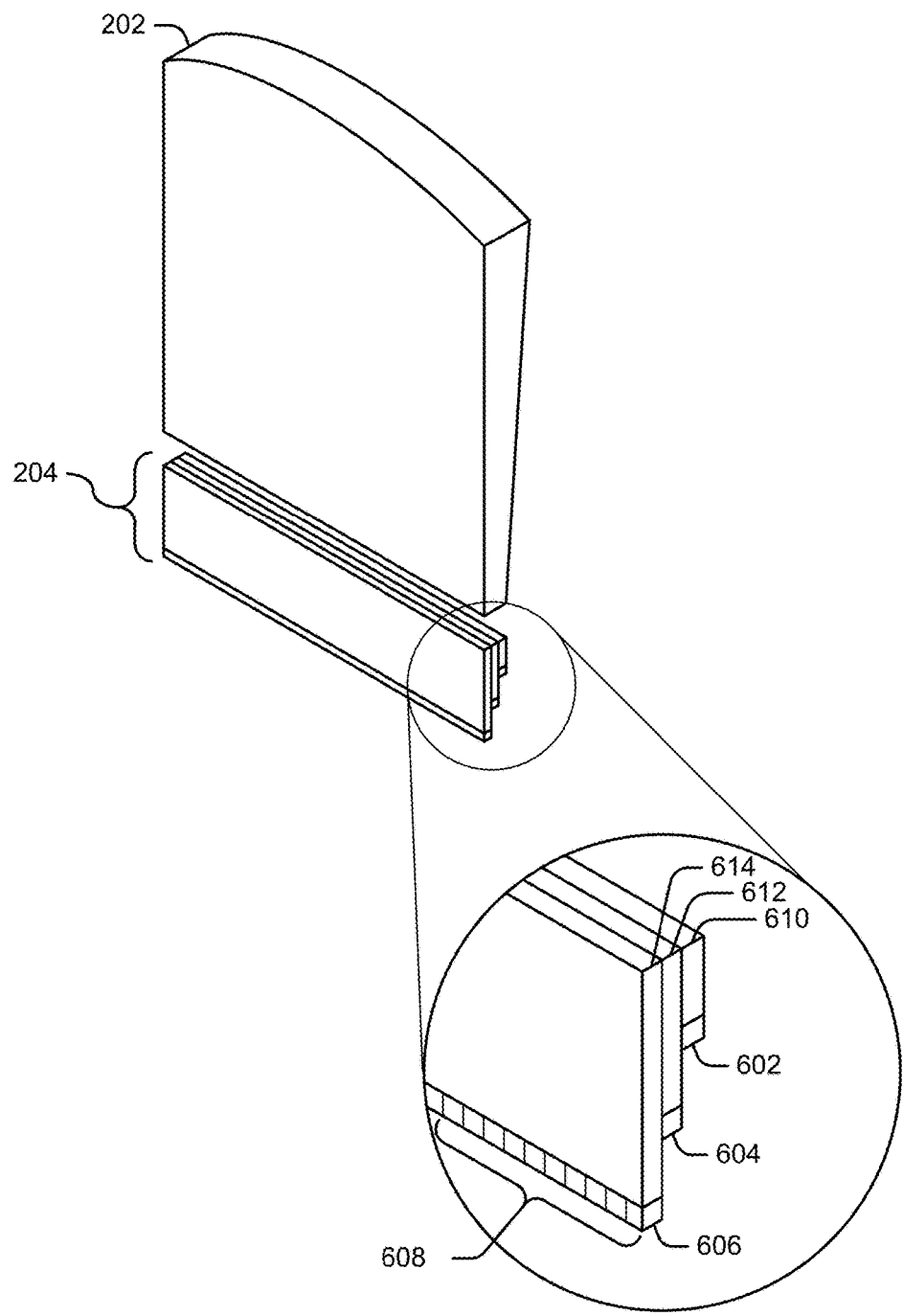
FIG. 6 illustrates a detailed example of the light injection system of FIG. 2.

FIG. 6 illustrates a detailed example of light injection system 204 of FIG. 2 in more detail. In this particular example, light injection system 204 includes light sources 602, 604, and 606 located at different distances from lens structure 202. Each light source located at a different distance from a light receiving surface of lens structure 202 has a different effective back focal length. Although shown as three light sources, light injection system 204 may include any suitable number or configuration of light sources.

Light sources 602, 604, and 606 include individually selectable light generating elements (elements) 608, such as LEDs arranged in a roughly linear configuration along a length of the light source (e.g., LED bars or strips). Elements 608 can be selected such that light sources 602, 604, or 606 provide light at different locations of a light receiving surface of lens structure 202 to scan light as described above.

Light sources 602, 604, and 606 are associated with light guides 610, 612, and 614 respectively. Generally, light guides 610, 612, and 614 transmit light from a respective light source to a light receiving surface of lens structure 202, such as then end 210 of an optical wedge. In some cases, light guides 610, 612, and 614 are useful to fold down back focal lengths of lens structure 202. Although shown as light guides, any suitable optical structure may be associated with light sources 602, 604, or 606 to transmit light thereof, such as light pipes, prisms, films, and the like. Light guides of different lengths can provide different optical path lengths for light transmitted through the light guide (or similar structure). In some cases, one or more of the light sources may not be associated with a light guide and/or located adjacent to lens structure 202 (not shown).

Additionally, light guides 610, 612, and 614 can be configured to prevent light sources 602, 604, and 606 from occluding one another and/or to reduce light pollution among the light sources. Although shown as having plate-like geometry, light guides 610, 612, and 614 may be configured in any suitable geometry. Additionally, light guides 610, 612, and 614 may comprise any suitable optically transmissive material, such as plastic, acrylic, glass, and the like. In some cases, a geometry or material composition of a light guide effects an optical path length associated with the light guide.

Figure 7:
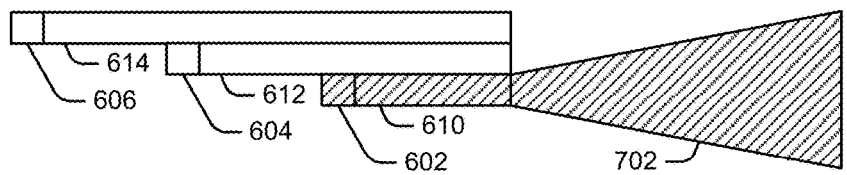
FIG. 7 illustrates an example light guide configuration of the display of FIG. 2 and ray traces associated with a light source.
Figure 8:
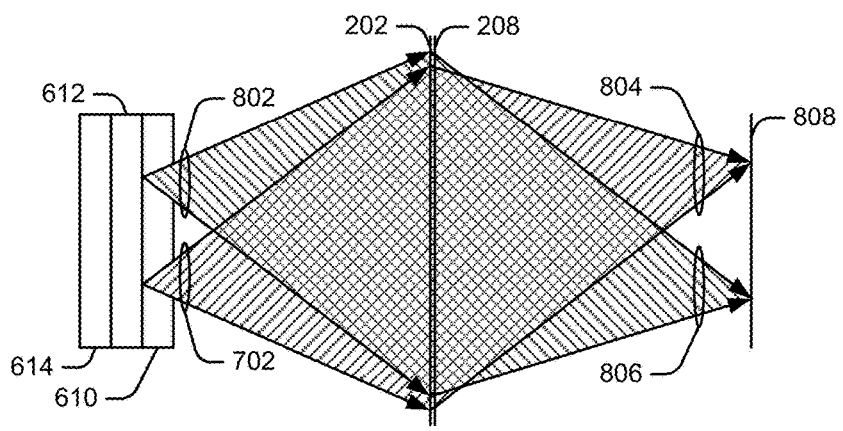
FIG. 8 illustrates a plan view of example ray traces associated with the light guide configuration and the light source of FIG. 7.

FIGS. 7 and 8 illustrate an example light pattern associated with a light guide of FIG. 6. Generally, a light guide associated with a respective light source will transmit light from that respective light source. As shown in FIG. 7, which illustrates a side view of light injection system 204, light 702 is generated by light source 602 and transmitted by light guide 610. Here, assume that light 702 is intended to direct light towards a viewer's right eye, capable of delivering a frame of stereoscopic imagery to the viewer's right eye.

FIG. 8 illustrates a plan view of example light patterns associated with the light guide of FIG. 7. Here, assume that light 802 is intended to direct light towards a viewer's left eye, capable delivering a frame of stereoscopic imagery to the viewer's left eye. Light 802 is also generated by light source 602; however, light 802 is generated at a different location by a set of elements 608 that is different from a set that generated light 702. For example, elements 608 located proximate an end of light source 602 generate light 802, while elements 608 proximate the other end of light source 602 generate light 702. Thus, although shown as overlapping in FIG. 8, light 702 and light 802 are not generated concurrently, but sequentially to direct light in different directions.

Lens structure 202 receives light 702 and 802 and emits light 804 and 806 respectively. Spatial light modulator 208 modulates light 804 and 806 with stereoscopic information intended for a viewer's right eye and left eye respectively. The stereoscopic imagery can be displayed to a viewer at focal plane 808 where the light is appropriately directed to each eye of the viewer. Focal plane 808 can be any suitable distance from lens structure 202 and may vary depending on a display device 102 in which stereoscopic display 124 is implemented. For example, focal plane 808 may be approximately 500-700 mm for laptop device 106 or approximately 3-5 m for television device 108. A depth of the focal plane at which the stereoscopic imagery can be viewed may vary, ranging for example from 50 mm to 300 mm.

Figure 9:
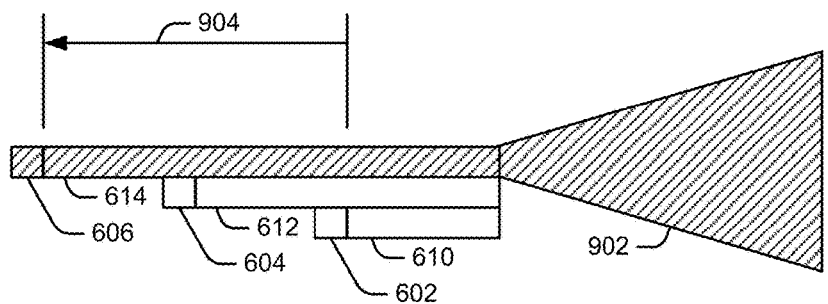
FIG. 9 illustrates an example light guide configuration of the display of FIG. 2 and ray traces associated with another light source.
Figure 10:
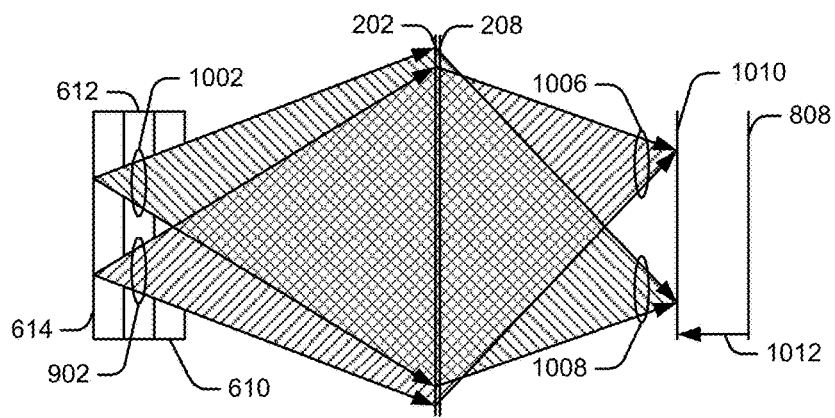
FIG. 10 illustrates a plan view of example ray traces associated with the light guide configuration and the other light source of FIG. 9.

FIGS. 9 and 10 illustrate another example light pattern associated with another light guide of FIG. 6. As shown in FIG. 9 which illustrates a side view of light injection system 204, light 902 is generated by light source 606 and transmitted by light guide 614. Here, assume that light 902 is intended to direct light towards a viewer's right eye, capable delivering a frame of stereoscopic imagery to the viewer's right eye. Note here, that light guide 614 is longer than light guide 610 by distance 904, thus selecting light source 606 changes a back focal length associated with light 902.

FIG. 10 illustrates a plan view of example light patterns associated with the light guide of FIG. 9. Here, assume that light 1002 is intended to direct light towards a viewer's left eye, capable delivering a frame of stereoscopic imagery to the viewer's left eye. Light 1002 is also generated by light source 606; however, light 1002 is generated at a different location by a set of elements 608, which is different from a set that generated light 902. For example, elements 608 located proximate an end of light source 606 generate light 1002, while elements 608 proximate the other end of light source 606 generate light 902. Thus, although shown as over-lapping in FIG. 10, light 902 and light 1002 are not generated concurrently, but sequentially to direct light in different directions. Also note that light guide 614 is a different length than the other light guides and configured such that the other light guides do not occlude light generated by light source 606.

Lens structure 202 receives light 902 and 1002 and emits light 1006 and 1008, respectively. Spatial light modulator 208 modulates light 1006 and 1008 with stereoscopic information intended for a viewer's right eye and left eye respectively. In this example, the stereoscopic imagery is displayed to a viewer at focal plane 1010, where the light is appropriately directed to each eye of the viewer. As shown by distance 1012, focal plane 1010 moves towards lens structure 202 when another light source is selected to inject light into lens structure 202.

A front focal distance of lens structure 202, at which the focal planes are located, can be varied by any suitable distance when different light sources are selected. In some cases, a light source has a back focal length that is different from those associated with other light sources. Selecting another light source having a different back focal length can change a distance at which the focal plane is located from a stereoscopic display 124. In some cases, the distance varies based on the type of device having the stereoscopic display. For example, a distance between focal plane 1010 and focal plane 808 can be approximately 100-150 mm for laptop device 106 or approximately 0.5-1.0 m for a television device. These distances are given merely as examples, and should not be construed as limitations, as other distances are contemplated to suit the viewing needs associated with different devices or environments. Additionally, the light sources may also be configured such that the focal planes of a stereoscopic display overlap, allowing stereoscopic imagery to be delivered to a moving viewer and/or to eliminate gaps between focal planes.

Figure 11:
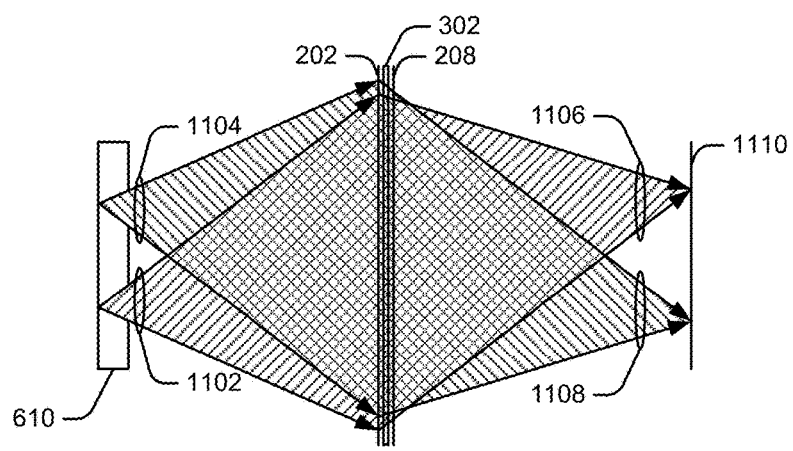
FIG. 11 illustrates a plan view of example ray traces associated with the liquid crystal lens of FIG. 3.
Figure 12:
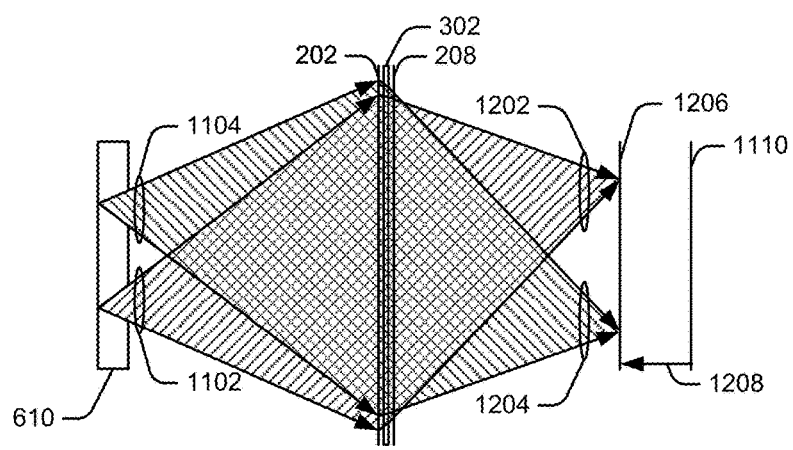
FIG. 12 illustrates a plan view of example of ray traces of re-focused light associated with the liquid crystal lens of FIG. 3.

FIGS. 11 and 12 illustrate a plan view of example ray traces associated with the liquid crystal lens of FIG. 3. Generally, LQ lens 302 is capable of changing a front focal distance of lens structure 202 by re-focusing light emitted by lens structure 202. As shown in FIG. 11, light 1102 and 1104 are generated by a light source (not show) and transmitted to lens structure by light guide 610. Although shown as overlapping in FIG. 11, light 1102 and 1104 are not generated concurrently, but sequentially to direct light in different directions. Assume here that light 1102 and 1104 are intended to direct light towards a viewer's right and left eyes respectively.

Lens structure 202 receives light 1102 and 1104 and emits light 1106 and 1108 respectively. As the light passes through LQ lens 302, it is focused to converge on the viewers eyes at focal plane 1110. Additionally or alternately, spatial light modulator 208 modulates light 1106 and 1108 with stereoscopic information intended for a viewer's right eye and left eye respectively. Focal plane 1110 can be any suitable distance from lens structure 202 and may vary depending on a display device 102 in which stereoscopic display 124 is implemented, examples of which are discussed above.

FIG. 12 illustrates a plan view of an example of re-focused ray traces associated with the liquid crystal lens of FIG. 3. Here, assume that light 1102 and 1104 are the same light shown in FIG. 11, although other light may be generated, such as when a viewer's relative Y position has changed. As in FIG. 11, lens structure 202 receives light 1102 and 1104 from light guide 610 and emits light 1202 and 1204 respectively. Assume here that light 1202 and 1204 are intended to direct light towards a viewer's right and left eyes respectively. As shown in FIG. 11, light 1204 and 1204 converge on a viewer's eyes at a focal plane. Here, however, LQ lens 302 re-focuses and changes a focal distance of lens structure 202 as shown by focal plane 1206. As shown by distance 1208, focal plane 1206 moves towards lens structure 202 when LQ lens 302 is re-focused. Thus, a front focal distance of lens structure 202 can be increased or decreased as needed by refocusing LQ lens 302 to implement a variable depth stereoscopic display.

Example Methods

Figure 13:
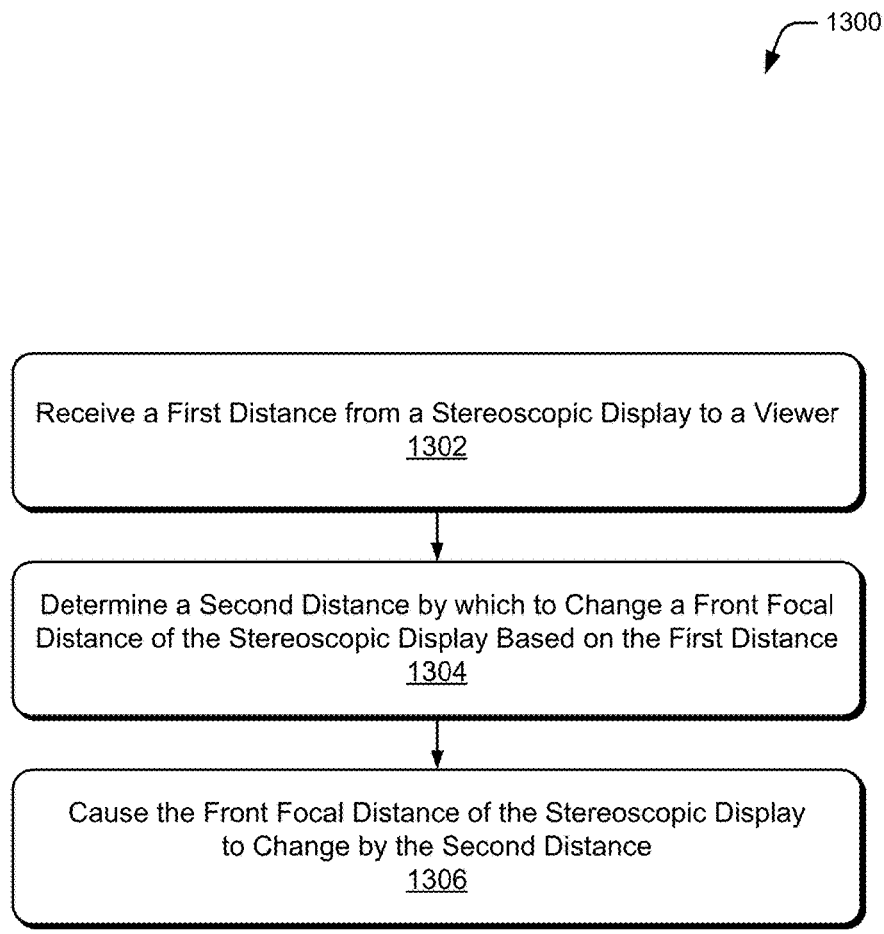
FIG. 13 is a flow diagram depicting an example method for causing a front focal distance of a stereoscopic display to change.

FIG. 13 is flow diagram depicting an example method 1300 for causing a front focal distance of a stereoscopic display to change. Block 1302 receives a first distance at which a viewer is disposed relative a stereoscopic display. In some cases, block 1302 receives a distance to a viewer that has moved towards or away from the stereoscopic display. A distance to the viewer may be received in the form of viewer positional data or viewer-tracking data. The viewer positional data can be collected by any suitable sensing technology, such as optical or imaging sensors, examples of which are described above.

Figure 14:
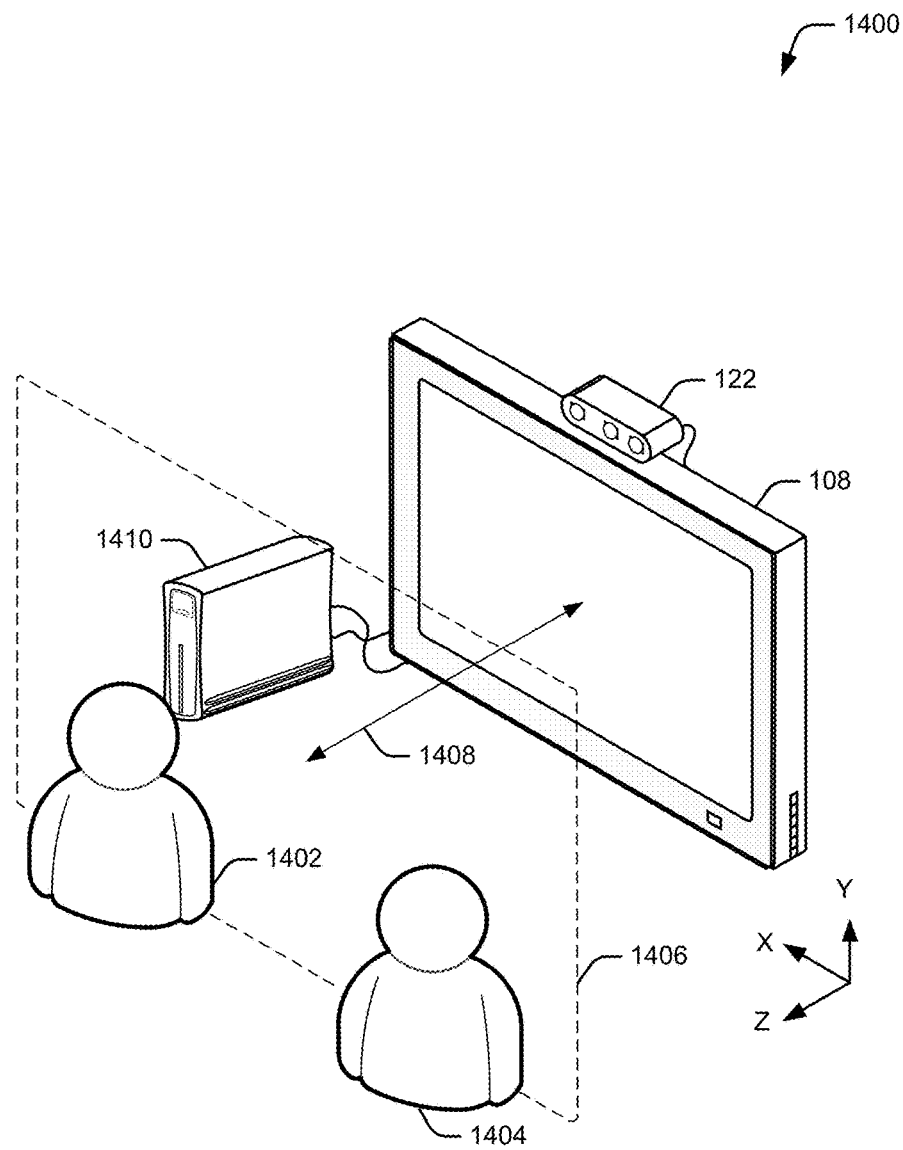
FIG. 14 illustrates an example viewing environment in which various embodiments of these apparatuses and techniques may be employed.

Consider method 1300 in the context of an example viewing environment 1400 illustrated by FIG. 14. Viewing environment 1400 includes television device 108 and viewers 1402 and 1404 located at viewing plane 1406. In this particular example, viewing plane 1406 is located at distance 1408 from television device 108.

In this example, gaming device 1410 is operably coupled with television device 108 and sensor 126 (shown as an external sensor) that collects positional data of viewers 1402 and 1404. In the context of the present example, controller 122 (not shown) of television device 108 receives a first distance 1408 from sensor 126 via gaming device 1410. Here, assume that controller receives viewer positional data from sensor 126. Controller 122 then analyzes the viewer positional data to determine distance 1408 to viewer 1402.

Block 1304 determines a second distance by which to change a front focal distance of the stereoscopic display based on the first distance. In some cases, determining the second distance is based on comparing the first distance with a current front focal distance of the stereoscopic display or a lens structure thereof. For example, the second distance may be the difference between the first distance to the viewer and the current front focal distance of the stereoscopic display. In the context of the present example, assume that the current front focal distance of television device 108 is approximately half of distance 1408 to viewer 1402. Here, controller 122 determines a second distance (half of distance 1408) by which to change a front focal distance of television device 108 such that a front focal distance of lens structure 202 (not shown) of television device 108 is approximately distance 1408.

Block 1306 causes the front focal distance of the stereoscopic display to change by the second distance. Changing the front focal distance of the stereoscopic display by the second distance can be effective to display a stereoscopic image at the first distance. In some case, the front focal distance is caused to change by the difference between the first distance to the viewer and the current front focal distance of the stereoscopic display. The front focal distance of the stereoscopic display, or a lens structure thereof, may be caused to change in any suitable way. In some cases, a liquid crystal lens may re-focus light emitted by a lens structure of the stereoscopic display. For example, LQ lens 302 may focus or refocus light emitted by lens structure 202 effective to change a front focal distance of stereoscopic display 124.

In other cases, selecting or enabling a light source of a light injection system may cause a front focal distance of the stereoscopic display to change. The selected light source that injects the light may be one of multiple light sources that are individually selectable to generate or emit light. In some cases, a back focal length associated with each of the multiple light sources is different. By selecting a light source having a particular back focal length to inject light, a front focal distance of a stereoscopic display can be changed such that a stereoscopic image is visible to viewers located in a focal plane proximate the first distance.

Alternately or additionally, a light source may be selected to cause the front focal distance to change based on the first distance and a lens structure's front focal distance associated with the light source. For example, the first distance to the viewer may correspond approximately to a front focal distance associated with a particular light source. Concluding the present example, controller 122 enables a light source (e.g., light source 604) based on the first distance to display stereoscopic imagery at distance 1408 enabling both viewers 1402 and 1404 to view 3D content. In this case, both viewers 1402 and 1404 are able to view the stereoscopic imagery as they are within the same focal plane of television device 108. In the context of the present example, controller 122 enables the same light source based on a distances to either viewer 1402 or viewer 1404 that are about the same distance from television device 108.

Optionally, method 1300 may repeat blocks 1302, 1304, and 1306 to display a stereoscopic image to a viewer that moves out of a focal plane or to multiple viewers in multiple different focal planes of a stereoscopic display.

Figure 15:
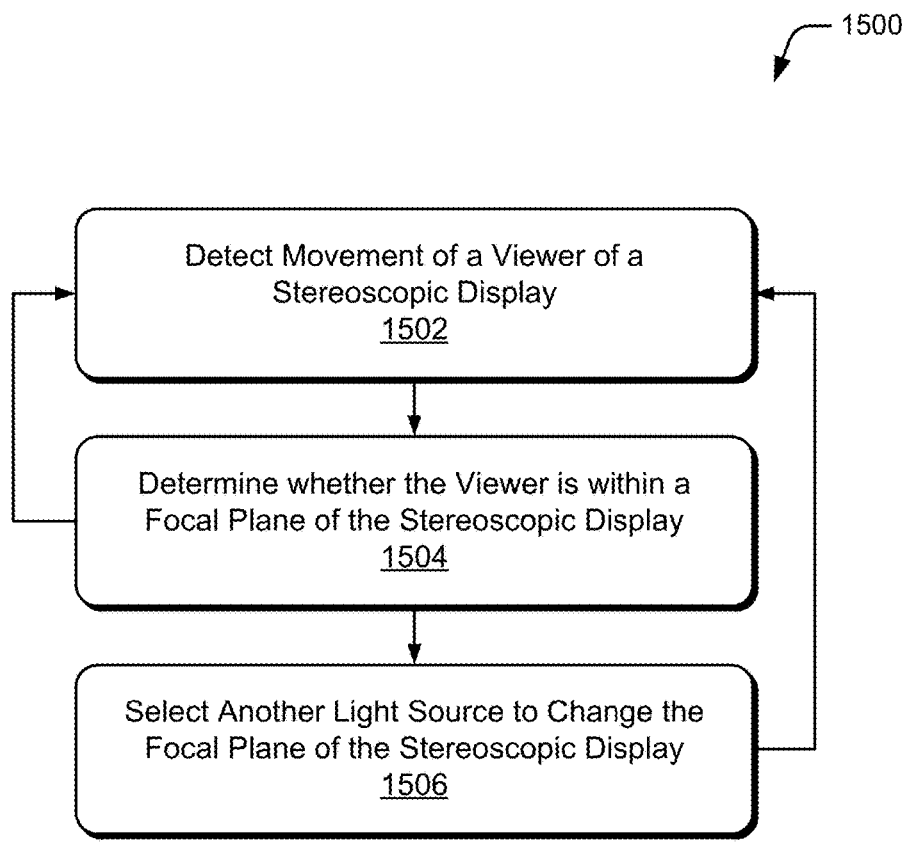
FIG. 15 is a flow diagram depicting an example method for selecting a light source to change a focal plane of a stereoscopic display.

FIG. 15 is a flow diagram depicting an example method for selecting a light source to change a focal plane of a stereoscopic display. Block 1502 detects movement of a viewer of a stereoscopic display. The stereoscopic display may be displaying 3D content to one or more viewers located within multiple focal planes. In some cases, movement of a viewer is detected by analyzing data collected by an optical or imaging sensor, examples of which are described above. The movement may be detected as a viewer moves towards or away from the stereoscopic display.

Figure 16:
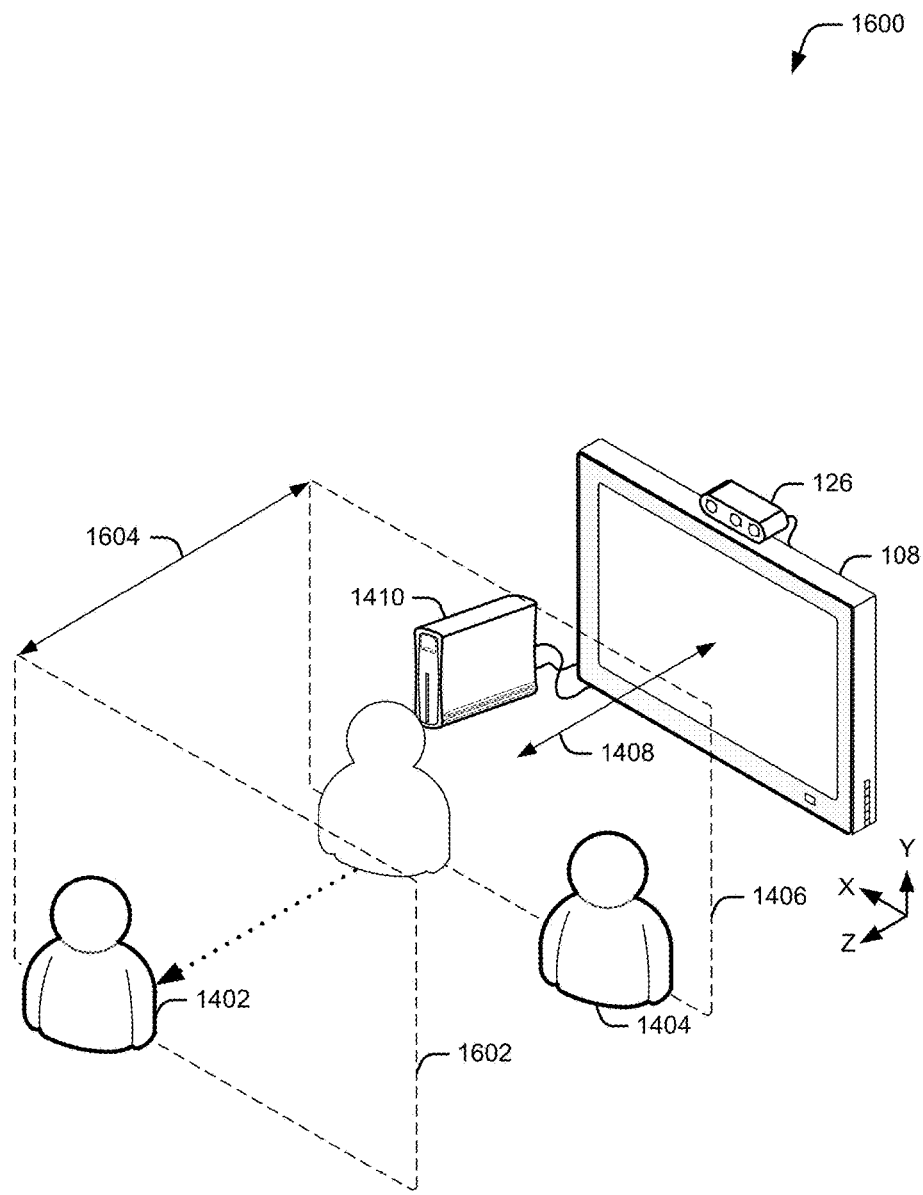
FIG. 16 illustrates the example viewing environment of FIG. 14 in which a viewer has moved out of a focal plane of a stereoscopic display.

Consider FIG. 16, which illustrates example viewing environment 1400 in which viewer 1402 has moved away from television device 108. In the context of this example, controller 122 detects movement of viewer 1402 as she moves away from television device 108 by analyzing viewer positional data received from sensor 126.

Block 1504 determines whether the viewer is within a focal plane of the stereoscopic display. A current focal plane or a front focal distance of the stereoscopic display may correspond with a currently selected light source having a particular back focal length. A viewer may be determined to be within a focal plane when a distance to the viewer corresponds approximately to that of a front focal distance of the stereoscopic display. Distances to one or more viewers may be received or determined by analyzing viewer positional data. In some cases, a viewer may move, yet remain within a focal plane of the stereoscopic display. If block 1504 determines that the viewer is within a current focal plane of the stereoscopic display, method 1500 returns to block 1502 where further movement may be detected. If block 1504 determines that the viewer is not within the current focal plane of the stereoscopic display, method 1500 proceeds to block 1506.

In some cases, a viewer may be determined to be within two overlapping focal planes. In such a case, a further determination is made as to whether the viewer is closer to a previously occupied focal plane or closer to another focal plane towards which the viewer is moving. In the context of the present example, controller 122 determines that viewer 1402 is not within focal plane 1406 and is moving towards another focal plane of television device 108.

Block 1506 selects another light source to change a focal length of the stereoscopic display. Changing the focal length of the stereoscopic display varies a distance at which the focal plane of the stereoscopic display is located. In some cases, changing a front focal length of the stereoscopic display includes selecting another light source having a back focal length that is different from a previously selected light source. Optionally, method 1500 may return to block 1502 to detect subsequent movement of the viewer or movement of another viewer.

Concluding the present example, controller 122 selects another light source (e.g., light source 602) operably associated with a lens structure of television device 108. In the context of the present example, selecting the other light source moves or creates an additional focal plane 1602 at distance 1604 from the original focal plane 1406. As shown in FIG. 16, television device 108 is able to display stereoscopic imagery to viewer 1402 now located within focal plane 1602. By repeating operations of method 1500 and other methods described herein, television device 108 can display stereoscopic imagery to one or more viewers as they move out of or between focal planes.

Figure 17:
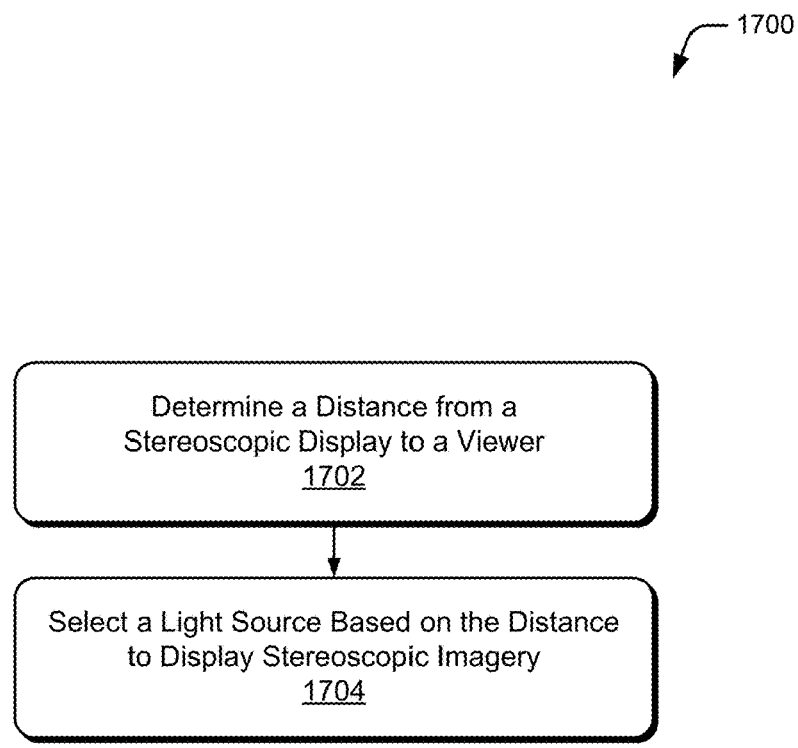
FIG. 17 is a flow diagram depicting an example method for selecting a light source based on a distance to a viewer.

FIG. 17 is a flow diagram depicting an example method for selecting a light source based on a distance to a viewer. Block 1702 determines a distance to a viewer of a stereoscopic display. The distance to the viewer may be determined by analyzing viewer positional data. Viewer positional data associated with the viewer can be collected using any suitable sensing technology, such as optical or imaging sensors, examples of which are described above. In some cases, determining a distance to a viewer may be responsive to detecting movement of the viewer. Additionally or alternately, block 1702 may determine distances to multiple viewers of the stereoscopic display.

In the context of the above-mentioned example, assume that viewers 1402 and 1404 reside in focal planes 1602 and 1406 respectively. Sensor 126 collects viewer positional data associated with viewer 1402 and transmits this data to controller 122. Controller 122 then determines a distance of viewer 1402 from television device 108 by analyzing the viewer positional data received from sensor 126.

Block 1704 selects a light source based on the distance from the stereoscopic display to the viewer. Selecting the light source based on the distance enables stereoscopic imagery to be displayed to the viewer. The light source may be selected from multiple light sources individually selectable to emit or generate light. The selected light source may have an associated back focal length that corresponds to a front focal distance of a lens structure. In some cases, the front focal distance of the lens structure is approximately the distance to the viewer.

A lens structure collimates the light generated by the selected light source. The light is then modulated by a spatial light modulator to display stereoscopic imagery to the viewer. Continuing the present example, controller 122 selects a light source (e.g., light source 602) of television device 108 effective to display stereoscopic imagery to viewer 1402 at focal plane 1602.

Additionally or alternately, method 1700 may repeat blocks 1702 and 1704 to display stereoscopic imagery to another viewer. For instance, another light source can be selected based on another distance to the other viewer. The other light source may have an associated back focal length that is different than a currently selected light source and corresponds with a different front focal distance of the lens structure. In such cases, this different front focal distance of the lens structure may be approximately the distance to the other viewer.

Light generated by the other light source is then and modulated to display stereoscopic imagery to the other viewer. Concluding the present example, controller 122 selects another light source (e.g., light source 604) effective to display stereoscopic imagery to viewer 1404 at focal plane 1406. Within their respective focal planes, viewers 1402 and 1404 are able to concurrently view 3D content displayed by television device 108.

The preceding discussion describes methods in which the techniques may enable the display of variable-depth stereoscopic imagery. These methods are shown as sets of blocks that specify operations performed but are not necessarily limited to the order shown for performing the operations by the respective blocks.

Aspects of these methods may be implemented in hardware (e.g., fixed logic circuitry), firmware, a System-on-Chip (SoC), software, manual processing, or any combination thereof. A software implementation represents program code that performs specified tasks when executed by a computer processor, such as software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computing devices.

Example Device

Figure 18:
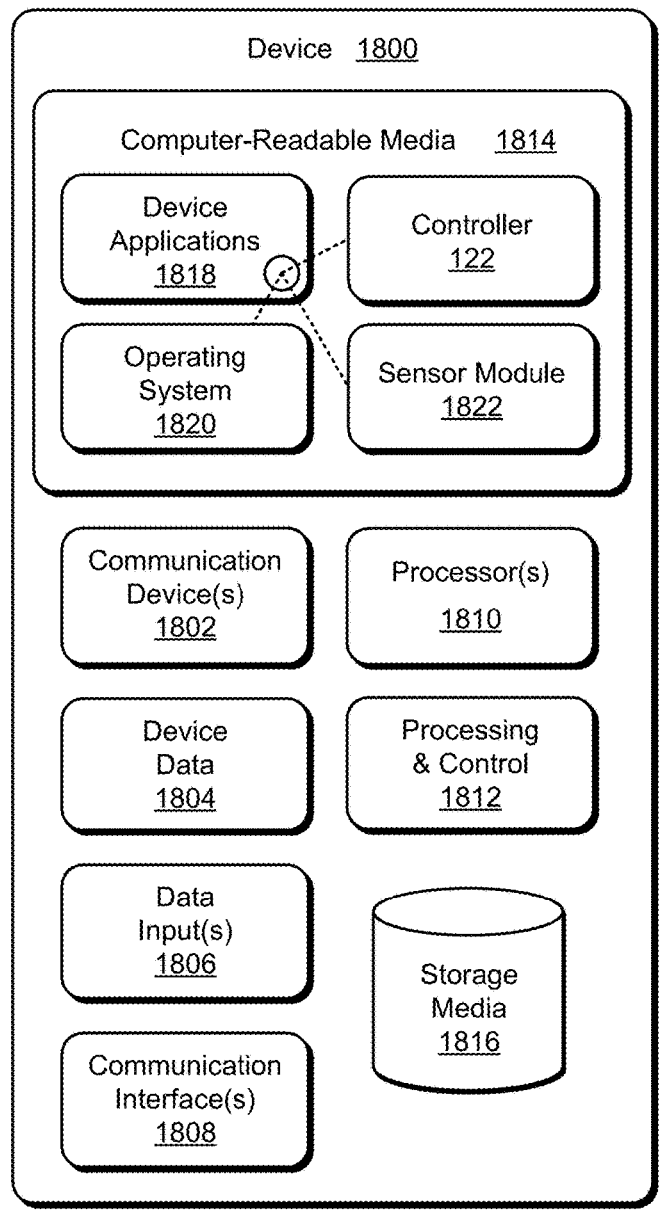
FIG. 18 illustrates an example device in which techniques for enabling a variable-depth stereoscopic display can be implemented.

FIG. 18 illustrates various components of example device 1800 that can be implemented as any type of client, server, and/or display device as described with reference to the previous FIGS. 1-14 to implement techniques enabling a variable-depth stereoscopic display. In embodiments, device 1800 can be implemented as one or a combination of a wired and/or wireless device, as a form of flat panel display, television, television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 1800 may also be associated with a viewer (e.g., a person or user) and/or an entity that operates the device such that a device describes logical devices that include users, software, firmware, and/or a combination of devices.

Device 1800 includes communication devices 1802 that enable wired and/or wireless communication of device data 1804 (e.g., received data, data that is being received, data scheduled for broadcast, data packets of the data, etc.). The device data 1804 or other device content can include configuration settings of the device, media content stored on the device, and/or information associated with a user of the device. Media content stored on device 1800 can include any type of audio, video, and/or image data. Device 1800 includes one or more data inputs 1806 via which any type of data, media content, and/or inputs can be received, such as user-selectable inputs, messages, music, television media content, recorded video content, and any other type of audio, video, and/or image data received from any content and/or data source.

Device 1800 also includes communication interfaces 1808, which can be implemented as any one or more of a serial and/or parallel interface, a wireless interface, any type of network interface, a modem, and as any other type of communication interface. The communication interfaces 1808 provide a connection and/or communication links between device 1800 and a communication network by which other electronic, computing, and communication devices communicate data with device 1800.

Device 1800 includes one or more processors 1810 (e.g., any of microprocessors, controllers, and the like), which process various computer-executable instructions to control the operation of device 1800 and to enable techniques for implementing a variable-depth stereoscopic display. Alternatively or in addition, device 1800 can be implemented with any one or combination of hardware, firmware, or fixed logic circuitry that is implemented in connection with processing and control circuits which are generally identified at 1812. Although not shown, device 1800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1800 also includes computer-readable storage media 1814, such as one or more memory devices that enable persistent and/or non-transitory data storage (i.e., in contrast to mere signal transmission), examples of which include random access memory (RAM), non-volatile memory (e.g., any one or more of a read-only memory (ROM), non-volatile RAM (NVRAM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1800 can also include a mass storage media device 1816.

Computer-readable storage media 1814 provides data storage mechanisms to store the device data 1804, as well as various device applications 1818 and any other types of information and/or data related to operational aspects of device 1800. For example, an operating system 1820 can be maintained as a computer application with the computer-readable storage media 1814 and executed on processors 1810. The device applications 1818 may include a device manager, such as any form of a control application, software application, signal-processing and control module, code that is native to a particular device, a hardware abstraction layer for a particular device, and so on.

The device applications 1818 also include any system components or modules to implement techniques using or enabling stereoscopic display. In this example, the device applications 1818 can include controller 122 and sensor module 1822 for analyzing and/or processing sensor information received from sensor 126.

CONCLUSION

This document describes various apparatuses and techniques for implementing a variable-depth stereoscopic display. By so doing, a front focal distance of a stereoscopic display can be varied to display stereoscopic imagery to a viewer at different distances. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. An optical system comprising:
a spatial light modulator configured to modulate diffuse light with frames of visual information to provide stereoscopic imagery to a viewer;
a liquid crystal lens configured to focus the diffuse light to enable viewing of the stereoscopic imagery over different respective ranges of distance;
a diffusion panel configured to provide the diffuse light by diffusing collimated light in a first direction and direct the diffuse light through the spatial light modulator;
an optical wedge having a viewing surface configured to emit the collimated light into the diffusion panel and a thin end configured to receive light for collimation;
two or more light source arrays individually selectable to inject the light for collimation into the thin end of the optical wedge, each of the two or more light source arrays being disposed at a different distance from the thin end of the optical wedge than others of the two or more light source arrays and configured to generate the light at different locations along the thin end of the optical wedge effective to scan, in a second direction that is substantially perpendicular to the first direction, the collimated light emitted by the optical wedge to direct different frames of the visual information to each eye of the viewer; and
a controller configured to:
determine a viewing distance at which the viewer is disposed relative the optical system; and
manipulate, based on the viewing distance and the different respective ranges of distance over which the liquid crystal lens enables viewing of the stereoscopic imagery, the liquid crystal lens by applying an excitation voltage to the liquid crystal lens such that the stereoscopic imagery is visible to the viewer disposed at the determined viewing distance.

2. The optical system as recited in claim 1, wherein the optical wedge further comprises a thick end disposed opposite the thin end, the thick end being configured to reflect at least some of the light within the optical wedge prior to emission from the viewing surface into the diffusion panel.

3. The optical system as recited in claim 1, further comprising light guides associated with the two or more light source arrays are configured to not occlude light patterns generated by the selected light source array.

4. The optical system as recited in claim 1, wherein the controller is further configured to receive, from a sensor, viewer positional data based on which the controller is configured to determine the viewing distance.

5. The optical system as recited in claim 1, wherein the controller is further configured to detect movement of the viewer in response to which the controller is configured to determine the viewing distance.

6. The optical system as recited in claim 1, wherein the optical system is configured as a non-projective flat panel display.

7. The optical system as recited in claim 1, wherein the visual information with which the spatial light modulator modulates the light includes parallax information associated with the stereoscopic imagery.

8. The optical system as recited in claim 1, the liquid crystal lens further comprising electrodes capable of applying the excitation voltage to the liquid crystal lens to re-align the liquid crystal molecules effective to re-focus the liquid crystal lens at various distances.

9. A system comprising:
a first light source and a second light source, the first and second light sources being disposed at different distances from a lens structure and individually selectable to scan light for displaying stereoscopic imagery, each of the first and the second light sources including an array of light generating elements configured to provide the scanned light by emitting light at different locations along the array such that the light is scanned in a first direction;
a first light guide configured to receive the scanned light emitted from the first light source and emit light to the lens structure and a second light guide, configured to receive the scanned light emitted from the second light source and emit light to the lens structure;
the lens structure configured to receive the light from the first and second light guides and emit collimated light to a diffusion panel, based on the patterns of scanned light generated by the first or the second light source;
the diffusion panel configured to receive the scanned collimated light from the lens structure and diffuse the scanned collimated light in a second direction that is substantially perpendicular to the first direction to provide diffuse light;
a liquid crystal lens configured to focus the diffuse light to enable viewing of the stereoscopic imagery over different respective ranges of distance;
a spatial light modulator configured to modulate the focused diffuse light with frames of the stereoscopic imagery; and
a controller configured to:
manipulate the liquid crystal lens by applying an excitation voltage to the liquid crystal lens, based on a distance at which a viewer is located with respect to the lens structure; and
synchronize the scanning of the light and the modulation of the scanned diffuse light such that different frames of the stereoscopic imagery are directed to each eye of the viewer at the viewing distance.

10. The system as recited in claim 9, wherein the lens structure is an optical wedge.

11. The system as recited in claim 9, wherein the lens structure is configured to collimate, via internal reflection, the scanned light to provide the scanned collimated light to the diffusion panel.

12. The system as recited in claim 9, wherein the different respective ranges of distance overlap such that the system is capable of providing stereoscopic imagery that is continuously viewable while the viewer transitions between the different respective ranges of distance.

13. The system as recited in claim 9, wherein the array of light generating elements includes light-emitting diodes (LEDs) that are individually selectable to emit the light at different locations along the array.

14. A computer-implemented method comprising:

determining a viewing distance at which a viewer is disposed relative to a lens structure of a stereoscopic display;

selecting a light source from multiple light sources of the stereoscopic display, based on the viewing distance and on a back focal length of the light source, to emit light into a receiving surface of the lens structure, each of the multiple light sources being disposed at a different distance from the lens structure than others of the multiple light sources and including a respective array of light emitting elements and being associated with a respective light guide;

injecting, via a subset of light emitting elements of the selected light source, the light into a location along the receiving surface the lens structure effective to direct the light emitted from a viewing surface of the lens structure toward the viewer's eye;

injecting, via another subset of light emitting elements of the selected light source, other light into another location along the receiving surface of the lens structure effective to direct the other light emitted from the viewing surface of the lens structure toward viewer' other eye, the location and other location being proximate opposite ends of the lens structure's receiving surface;

modulating the light directed towards the viewer's eye and the other light directed toward the viewer's other eye with different frames of visual information; and focusing, via a liquid crystal lens, the light and the other light such that the stereoscopic imagery is visible to the viewer disposed at the viewing distance.

15. The method as recited in claim 14, wherein the lens structure is an optical wedge comprising a thin end configured as the receiving surface and a thick end disposed opposite the thin end, the thick end being configured to reflect at least some of the light within the optical wedge prior to emission from the viewing surface.

16. The method as recited in claim 14, wherein the act of modulating is performed via a spatial light modulator disposed between the viewing surface of the lens structure and the viewer.

17. The method as recited in claim 14, wherein the different frames of visual information with which the light and other light are modulated includes parallax information associated with the stereographic imagery.

18. The method as recited in claim 14, wherein the array of light emitting elements comprises an array of light emitting diodes (LEDs) that are individually selectable to emit the light into the receiving surface of the lens structure.

19. The method as recited in claim 14 further comprising, prior to determining the viewing distance, detecting movement of the viewer via a sensor, and wherein determining the viewing distance is in response to detecting the movement of the viewer.

20. The method as recited in claim 14 further comprising, prior to the act of modulating, diffusing the light and the other light emitted from the viewing surface in one dimension via a diffusion panel having a prismatic surface.

* * * * *